No. 712,023. Patented Oct. 28, 1902.
A. B. VANES.
ATTACHING DOOR KNOBS TO SPINDLES.
(Application filed Dec. 11, 1901.)
(No Model.)
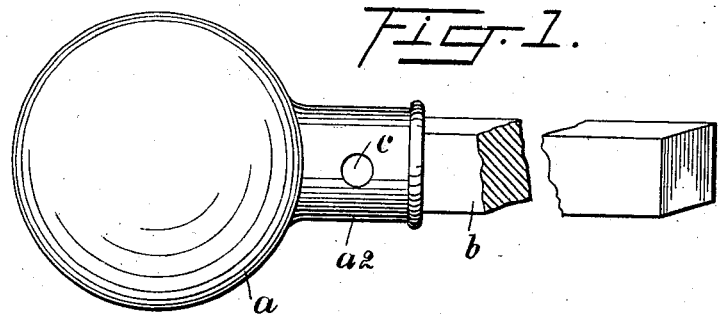
Fig. 1.
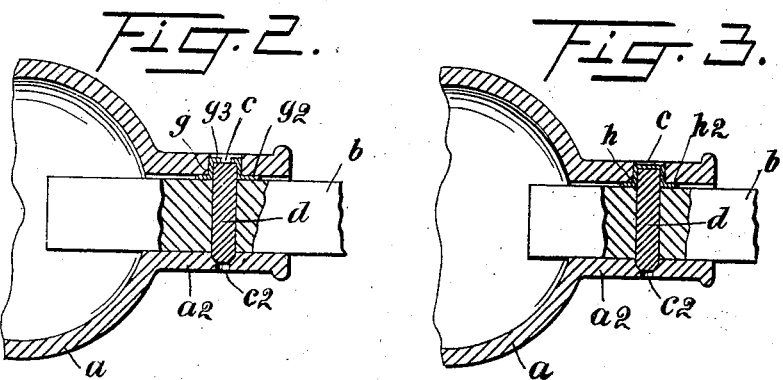
Fig. 2.
Fig. 3.
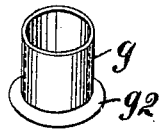
Fig. 4.
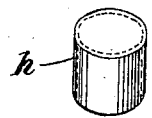
Fig. 5.
WITNESSES
F. A. Stewart
C. E. Mulreany
INVENTOR
BY Arthur B. Vanes
Edgar Tate & Co
ATTORNEYS
THE NORRIS PETERS CO., PHOTO-LITHO., WASHINGTON, D. C.

UNITED STATES PATENT OFFICE.

ARTHUR BAYLY VANES, OF ST. MARGARETS-ON-THAMES, ENGLAND.

ATTACHING DOOR-KNOBS TO SPINDLES.

SPECIFICATION forming part of Letters Patent No. 712,023, dated October 28, 1902.

Application filed December 11, 1901. Serial No. 85,427. (No model.)

*To all whom it may concern:*

Be it known that I, ARTHUR BAYLY VANES, a subject of the King of Great Britain, residing at Riverdon, St. George's road, St. Margarets-on-Thames, England, have invented certain new and useful Improvements in Means for Attaching Door-Knobs to Spindles, of which the following is a full and complete specification, such as will enable those skilled in the art to which it appertains to make and use the same.

The object of this invention is to provide improved devices for attaching door-knobs to their spindles; and the invention consists in a device of this class which is simple in construction and operation and by means of which a knob may be securely connected with a spindle in such manner that it cannot be accidentally detached therefrom and will not work off in the operation thereof.

In the drawings forming part of this specification, in which like letters of reference designate corresponding parts in the several views, Figure 1 is a side elevation of a door-knob provided with a spindle; Fig. 2, a sectional side view thereof; Fig. 3, a view similar to Fig. 2, showing a modification; Fig. 4, a perspective view of a thimble which I employ; and Fig. 5, a view similar to Fig. 4, showing a modification.

In the drawings forming part of this specification I have shown at $a$ an ordinary door-knob provided at one side with a tubular shank $a^2$, and said knob is provided with the usual spindle $b$, which is inserted into the shank $a^2$. The spindle $b$ is angular in cross-section, and the hole in the shank $a^2$ of the knob $a$ is similarly formed, and in practice I drill a hole $c$ transversely through the shank $a^2$ of the knob $a$ and through the spindle $b$. The hole in the top portion of the shank $a^2$ is larger than that in the spindle, and the hole in the bottom of the shank $a^2$ is much smaller, as shown at $c^2$, than is the hole in the top of said shank. That portion of the hole $c$ in the bottom of the shank of the knob is reamed out inside of said shank, so as to receive the end of a key pin or plug $d$, which is preferably of the same diameter throughout. The balance of the hole is smaller than said key pin or plug, as clearly shown in Figs. 2 and 3, while the hole in the top portion of the shank $a^2$ is larger than the key pin or plug, as is also clearly shown in said figures, and said key pin or plug is shorter than the combined transverse diameter of the shank $a^2$ and the spindle $b$. In practice I also provide a thimble $g$, made of sheet metal and provided at the lower end thereof with a flange or rim $g^2$, and said thimble is open at its upper end, and in connecting the knob with the spindle the thimble $g$, which is shown on an enlarged scale in Fig. 4, is placed into the shank $a^2$ of the knob and into the upper portion of the hole $c$, as shown in Fig. 2. The spindle $b$ is then inserted into said shank, and the key pin or plug $d$ is passed downwardly through the top portion of the hole $c$ and through said spindle and through the thimble $g$ and rests in the position shown in Fig. 2. The upper end or top of the thimble $g$ is then bent inwardly to form an inwardly-directed flange or rim $g^3$, while the bottom flange or rim $g^2$ fits between the spindle $b$ and the top wall of the shank $a^2$. By means of this construction the key pin or plug $d$ cannot work out, and in order to disconnect the spindle from the knob a suitable instrument is driven through the bottom portion $c^2$ of the hole $c$ and the key pin or plug driven out through the top portion of said hole, which operation spreads out the rim or flange $g^3$, as will be readily understood.

The thickness of the spindle is slightly less than the transverse dimensions of the hole in the shank $a^2$, through which the spindle passes, this being necessary in order to provide a space for the flange $g^2$, and in Fig. 5 I have shown a modified form of thimble, (designated by the reference character $h$.) This thimble is tubular in form and closed at one end and open at the other, and in assembling the parts the spindle $b$ is first inserted into the shank $a^2$ and the open end of the thimble $h$ is passed down through the larger portion or top portion of the hole $c$ and said thimble is driven down with a hammer. This operation spreads out the bottom of the thimble so as to form a flange $h^2$ to hold the thimble in place and prevents the key pin or plug $d$ from working out. With this form of construction the key pin or plug can be driven out in the same manner as when the construction shown in Fig. 2 is employed, and the operation of this device will also be practically the same as that shown in Fig. 2.

Having fully described my invention, what I claim as new, and desire to secure by Letters Patent, is—

A door-knob provided with a hollow shank adapted to receive a spindle, said shank and said spindle being bored transversely, the hole in one side of said shank being larger than in the other and adapted to receive a thimble open at one end, and a key pin or plug, adapted to be passed through the larger hole in one side of said shank and through the spindle, and to rest in the side of the shank having the smaller hole, said thimble being adapted to prevent the outward movement of the key pin or plug, substantially as shown and described.

In testimony that I claim the foregoing as my invention I have signed my name, in presence of the subscribing witnesses, this 5th day of November, 1901.

ARTHUR BAYLY VANES.

Witnesses:
   JAMES WILLIAMS,
   EMILY BLANCHE VANES.